Patented May 19, 1953

2,639,301

UNITED STATES PATENT OFFICE 2,639,301

PREPARATION OF BROMOFLUOROMETHANES

Robert P. Ruh and Ralph A. Davis, Midland, Mich., assignors to The Dow Chemical Company, Midland, Mich., a corporation of Delaware No Drawing. Application November 2, 1949, Serial No. 125,162

8 Claims. (Cl. 260—653)

This invention relates to the preparation of bromofluoromethanes, and, more particularly, to the preparation of bromodifluoromethane and dibromodifluoromethane.

Bromodifluoromethane and dibromodifluoromethane are known compounds. Various methods have been disclosed for the preparation of these two compounds, e. g., (a) the fluorination of bromoform at 110° C. to 120° C. by the action of antimony trifluoride in the presence of bromine to produce bromodifluoromethane, and (b) the fluorination of carbon tetrabromide at 140° C. to 150° C. by the action of silver fluoride to produce dibromodifluoromethane. Dibromodifluoromethane has great utility as a fire extinguisher (see, for example, the September 1949 Progress Report of the Aircraft Fire Prevention Program of the C. A. A.); bromodifluoromethane is also useful as a refrigerant for air conditioning units, and as a carrier or propellant (e. g., for insecticides or for paints).

Heretofore, no method for producing either bromodifluoromethane or dibromodifluoromethane by the bromination of difluoromethane has been disclosed. Henne (J. Am. Chem. Soc. 59, 1201 (1937)) attempted the bromination (as well as the chlorination) of a closely related compound, fluoroform; he reported that the bromination of fluoroform is not possible (as well as that the direct chlorination thereof is extremely difficult). In view of Henne's statement that the bromination of fluoroform is impossible, it is entirely unexpected that difluoromethane can be brominated.

The principal object of the present invention is to provide an improved method for producing bromodifluoromethane and dibromodifluoromethane. More specific objects and advantages are apparent from the specification, which illustrates and discloses, but is not intended to limit the invention.

According to the invention bromofluoromethanes are produced by a method that comprises effecting a vapor phase bromination of difluoromethane. Molecular bromine is used as the brominating agent, and the bromination is effected at a temperature between about 250° C. and the pyrolysis temperature under the conditions employed. A contact time not longer than about 75 seconds is used. Bromodifluoromethane and dibromodifluoromethane can be produced simultaneously by this method.

As has been indicated, the reaction of the invention is a vapor phase bromination. This bromination proceeds at temperatures as low as about 250° C., and at temperatures up to the pyrolysis temperature (i. e., the temperature at which either the difluoromethane starting material or one of the products undergoes thermal decomposition). It is usually preferred that the reaction be conducted at a temperature between about 400° C. and about 600° C. so that the reaction proceeds at a practical rate.

The contact time (i. e., the average time that a unit quantity of gas is in the reaction zone) that is used in carrying out a vapor phase bromination of difluoromethane and the temperature at which the bromination is conducted are related. In general, if the reaction temperature is lower the contact time must be higher in order to achieve a given yield of the desired product. For example, if the bromination is carried out at a temperature of about 300° C., it is usually desirable to use a contact time between about 50 seconds and about 60 seconds; if, on the other hand, a reaction temperature of 600° C. is used, a contact time between about 5 seconds and about 10 seconds is usually desired. It is ordinarily preferred to conduct the bromination of the invention at a comparatively high temperature, using a relatively short contact time, because optimum utilization of the equipment is thus accomplished. Accordingly, it is preferred to use contact times of from about one second to about 25 seconds, such contact times are practical when the temperature at which the reaction is conducted is within the preferred range indicated above. Contact times of a fraction of a second are entirely feasible in the practice of the invention and may, in some instances, be particularly advantageous. To produce bromofluoromethanes according to the invention, and using a short reaction time, the reactants can be passed through a reaction zone in which heating may be very rapidly effected (e. g., one in which the available heating surface area is relatively large in comparison with the volume of the gas in the reactor). Under such conditions, if the reaction temperature is comparatively high, e. g., between about 500° C. and about 600° C. extremely short contact times are practicable, and are highly advantageous for the reason that the equipment cost of producing bromofluoromethanes is minimized.

It is usually desired that the mol ratio of bromine to difluoromethane be at least about 0.5:1, although bromination proceeds in accordance with the invention with merely a trace of bromine present (e. g., as little as one mol per ten mols of difluoromethane). Ordinarily, there is no reason to use more than about five mols of bromine per mol of difluoromethane, and it is usually preferred to use from about one to about 2.5 mols of bromine per mol of difluoromethane.

The reaction of the invention is conducted either batchwise or continuously. If the reaction is conducted batchwise, the difluoromethane and bromine are added to an evacuated flask which is then brought to a temperature at which reaction proceeds and illuminated by a light source. However, it is preferred that the process be conducted continuously, because the reaction is more easily carried out continuously, and because better yields result. The reaction is conducted continuously in any convenient reaction vessel; a tube is ordinarily adequate for the purpose. It is usually desirable that the tube, or other reaction vessel, be packed with a material inert to the reactants and to the products in order to increase the effective heat transfer surface.

Although it is not essential, it is sometimes desired to conduct the reaction so that the gases are subjected to the action of light. Sunlight is effective for this purpose, but an ordinary tungsten light bulb source, or ultraviolet light can also be used.

The following examples illustrate the new process but are not to be construed as limiting the scope of the invention.

EXAMPLE 1

The following procedure was used to produce a bromodifluoromethane:

A platinum-lined tube having an internal diameter of 14 millimeters and an overall length of 16 inches was placed in a 15 inch muffle furnace. The furnace was heated to maintain the temperature of the tube (as estimated by determining the temperature of the outside of the tube with a chromel-alumel thermocouple) at about 600° C. A mixture of gases was produced by passing difluoromethane (a total of 26 grams) through liquid bromine maintained at a temperature between about 45° C. and about 50° C. The resulting mixture (which was composed of about one mol of bromine per mol of difluoromethane) was passed through the heated, platinum-lined tube at such a rate that the contact time was about 4 seconds. The effluent products were passed through water scrubbers, dried over anhydrous calcium sulfate, and condensed in receivers cooled by an acetone-Dry Ice mixture. The desired products were recovered by fractional distillation in a Podbielniak column; the fractionation yielded 7.5 grams of difluoromethane, 38.0 grams of bromodifluoromethane, and 9.0 grams of dibromodifluoromethane.

EXAMPLE 2

A Vycor tube having an internal diameter of 1 inch and an overall length of 32 inches was placed in an open-coil electric furnace. ("Vycor" glass contains from 90 to 96 per cent silica and is made by the Corning Glass Works.) The internal length of the furnace was 24 inches so that a 24 inch section of the Vycor tube was heated in the furnace. The furnace was heated to maintain the temperature of the heated portion of the tube at about 500° C. (as estimated by determining the temperature of the outside of the tube with a chromel-alumel thermocouple). A mixture of gases was produced by passing difluoromethane (a total of 28 grams) through liquid bromine maintained at a temperature between about 52° C. and about 58° C. The resulting mixture (which was composed of about 1.9 mols of bromine per mol of difluoromethane) was passed through the heated Vycor tube at such a rate that the contact time was about 15 seconds. The effluent products were passed through water scrubbers, dried over anhydrous calcium sulfate, and condensed in receivers cooled by an acetone-Dry Ice mixture. The desired products were recovered by fractional distillation in a Podbielniak column; the fractionation yielded 4.2 grams of difluoromethane, 27.2 grams of bromodifluoromethane and 46.1 grams of dibromodifluoromethane.

The procedure of the preceding paragraph was repeated using a molecular ratio of bromine to difluoromethane of 0.94, a tube temperature of 575° C. and a contact time of 16 seconds. Fractionation of the crude product indicated that the mol ratio of bromodifluoromethane to dibromodifluoromethane was 4.4:1.

EXAMPLE 3

A series of brominations was conducted in order to compare the effect of changing the temperature and contact time, as well as the ratio of bromine to difluoromethane, upon the reaction. The results of these brominations are presented in the table, below. Bromination was conducted according to the procedure described either in Example 1 or in Example 2 (i. e., in a platinum-lined tube or in a Vycor tube). In the table, the type of tube used for the bromination, the contact time, the mol ratio of bromine to difluoromethane, and the per cent conversion (determined by titrating the HBr formed in the course of the bromination, and assuming all the HBr to have been formed in the production of dibromodifluoromethane) of the difluoromethane are presented. The figures in the table which represent per cent conversion are 100 times the mols of HBr identified divided by 2 times the mols of difluoromethane charged.

*Table*

| Type of tube used for bromination | Temperature of tube in °C. | Contact time in seconds | Mol ratio of bromine to difluoromethane | Percent conversion of difluoromethane |
|---|---|---|---|---|
| Platinum-lined tube | 600 | 4 | 1.0 | 46 |
| Vycor tube | 500 | 15 | 1.9 | 61 |
| Do | 400 | 55 | 1.4 | 29 |
| Do | 300 | 50 | 1.5 | 4.7 |
| Do | 575 | 16 | 0.9 | 45 |

Having described the invention, we claim:

1. A method of producing bromofluoromethanes that comprises effecting a vapor phase bromination of difluoromethane with molecular bromine at a temperature between about 250° C. and the pyrolysis temperature under the conditions employed, using a contact time not longer than about 75 seconds.

2. A method as claimed in claim 1 in which the bromination is effected at a temperature between about 400° C. and about 600° C.

3. A method as claimed in claim 2 in which the contact time is from 1 second to 25 seconds.

4. A method of producing bromofluoromethanes that comprises passing a vapor phase mixture of difluoromethane and molecular bromine through a zone heated to a temperature between about 400° C. and about 600° C., using a contact time of from 1 to 25 seconds, wherein the molar ratio of bromine to difluoromethane is from 1:1 to 2.5:1.

5. A method as claimed in claim 4 in which the reaction is conducted in a packed tube.

6. A method of producing dibromodifluoromethane that comprises passing a vapor phase mixture of difluoromethane and at least an equimolar proportion of molecular bromine through a zone heated at a temperature between about 250° C. and the pyrolysis temperature under the conditions employed, using a contact time not longer than about 75 seconds, and separating dibromodifluoromethane from the resulting product.

7. A method of producing dibromodifluoromethane that comprises passing a vapor phase mixture of difluoromethane and bromine through a zone heated at a temperature between about 400° C. and about 600° C., using a contact time of from 1 to 25 seconds and a molar ratio of bromine to difluoromethane from 1:1 to 2.5:1, and separating dibromodifluoromethane from the resulting product.

8. A method process according to claim 7 wherein the molar ratio of bromine to difluoromethane is about 1.9 and the reaction temperature is about 500° C.

ROBERT P. RUH.
RALPH A. DAVIS.

References Cited in the file of this patent

UNITED STATES PATENTS

| Number | Name | Date |
|---|---|---|
| 2,407,129 | Benning et al. | Sept. 3, 1946 |
| 2,459,767 | Calfee et al. | Jan. 18, 1949 |

OTHER REFERENCES

Henne et al., J. Am. Chem. Soc., vol. 61, pp. 938–39 (1939).

Brice et al., J. Am. Chem. Soc., vol. 68, pp. 968 (1946).

Simons, "Fluorine Chemistry," pp. 468–70, Academic Press Inc., New York, N. Y. (1950).